Patented Mar. 27, 1934

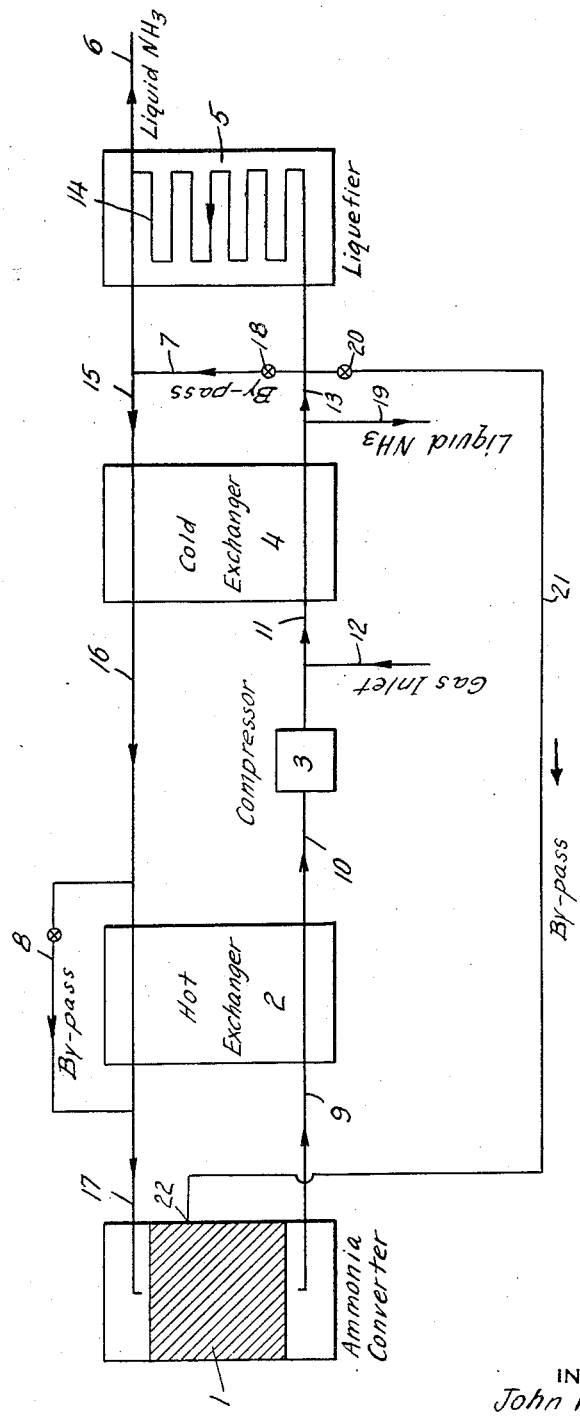

1,952,909

UNITED STATES PATENT OFFICE 1,952,909

METHOD OF TEMPERATURE CONTROL

John W. Davis, Prince George County, Va., assignor to Atmospheric Nitrogen Corporation, New York, N. Y., a corporation of New York Application November 28, 1930, Serial No. 498,731

7 Claims. (Cl. 23—199)

The invention relates to the synthetic production of ammonia by the reaction of nitrogen and hydrogen in the presence of a catalyst, more particularly to a method of controlling the temperature in the catalytic reaction zone.

The process for the production of ammonia to which this invention relates comprises the introduction of a gaseous mixture of nitrogen and hydrogen, preferably in the proportion of 1:3 into a catalytic chamber and contacting the mixture therein with a suitable catalyst at a proper pressure and temperature. In order to obtain efficient operation a carefully regulated, uniform and relatively high temperature condition is required and it is usual in this connection to preheat the gases entering the reaction chamber by passing them in heat exchange relation with the hot gases coming from the reaction zone. While conditions in an ammonia synthesis system when once established will generally speaking remain constant and therefore as desired or predetermined, there are of necessity incidental or accidental variations from time to time.

The efficiency of the heat exchange apparatus may vary, the purity, pressure or velocity of the gas may temporarily change, etc. Each one of these factors of itself or because of its effect on the rate of formation of ammonia will tend to change temporarily the desired predetermined temperature condition of the catalyst. These incidental changes in temperature conditions have become of increasing importance as the art has advanced in the development of more active ammonia catalysts. Efficient use of these catalysts requires not only that the temperature shall be within the range of activity of the catalyst but that it shall be and remain practically continuously within the particular and relatively small portion of that range corresponding to maximum activity. Only under such carefully controlled temperature conditions can the advantages of such catalysts be realized commercially. It is, therefore, highly desirable to have means which will function quickly and exactly to offset the above referred to temporary and incidental fluctuations in the various temperature factors.

It is well recognized practice to vary the extent of heat exchange for example by by-passing a part of one of the gases around the heat exchange apparatus. Often this expedient in preventing the over-stepping of the upper limit of the predetermined temperature range either is not sufficiently rapid in its action to be effective or else causes such a violent drop in temperature as to seriously interfere with production. Under these conditions of difficult control incident to operation for maximum production, I have found that by varying the ammonia content of the nitrogen-hydrogen gas contacted with the catalyst, either by itself or in conjunction with other temperature controlling means, the catalyst temperature may be satisfactorily maintained.

The primary object of the invention is to provide a process by means of which substantial fluctuations in the temperature of the catalyst zone may be avoided or rectified and to thereby maintain the catalyst temperature within a desired range which is preferably the optimum temperature range for the particular catalyst.

I have found that the temperature in the reaction zone, when ammonia is produced synthetically by contacting a gaseous mixture of nitrogen and hydrogen with a catalyst under suitable conditions of temperature and pressure, may be controlled and maintained within a desired range by varying the amount of ammonia present in the reaction mixture, and that this I may accomplish by withdrawing, as required, a portion of the reaction product gaseous stream containing ammonia and introducing the thus withdrawn gas into the ingoing reaction mixture. There will thus be present in the ingoing reaction mixture an amount of ammonia differing from that normally present and thereby incidental temperature fluctuations, particularly in the reaction zone, may be offset.

The withdrawal of varying proportions of the reaction product gas prior to the completion of extraction of ammonia therefrom and the reintroduction thereof into the ingoing reaction mixture permits the control and maintenance of the temperature in the reaction zone at a point within the temperature range for optimum commercial operation. This may be accomplished by by-passing the desired amount of reaction product gas containing ammonia at a point preceding the final ammonia removal which may be effected by liquefaction and/or absorption to the ingoing reaction mixture. The control thus provided is certain if the quantity of ammonia-containing gas allowed to by-pass be varied according to the temperature conditions prevailing at the time, and be continued during such an interval as may be required to bring the temperature in the reaction zone within the desired range. In a cyclic ammonia synthesis system where the unconverted nitrogen-hydrogen gases are returned to the catalyst after passing through the ammonia removal apparatus, the ammonia content of the gases going to the catalyst may be varied in accordance with my invention by suitable regulation of the degree of ammonia removal in said apparatus.

The invention therefore comprises producing ammonia by reacting nitrogen and hydrogen in the presence of a catalyst and controlling the temperature in the reaction zone by varying the amount of ammonia present in the reaction mixture. This may be occasioned by adding to or subtracting from the ingoing reaction mixture ammonia in amounts depending upon the direction and rate of temperature fluctuations in the reaction zone, thus changing the amount of ammonia present in the ingoing reaction mixture coincidentally with such fluctuations. Thus, by withdrawing or temporarily by-passing a portion of the gaseous mixture around the ammonia liquefier and to the ingoing reaction mixture, the amount of ammonia present in the ingoing reaction mixture may be varied from that normally present in the gases leaving the liquefier.

The invention may be practiced, for example, with respect to a synthetic ammonia system in which the unconverted nitrogen-hydrogen gases are returned to the catalyst with an additional amount of a fresh nitrogen-hydrogen gas mixture. The system in connection with which the invention may be practiced comprises a catalyst unit or ammonia converter, hot exchangers, cold exchangers, a liquefier unit or units and a means for circulating the gaseous mixture, which may be a suitable compressor. Such a system for purposes of illustration is shown diagrammatically in the drawing, and the process will now be described in conjunction with this drawing.

The gaseous mixture entering the system may be produced in any well-known manner to give a mixture of nitrogen and hydrogen in the preferred ratio of 1:3 and of the proper degree of purity. The nitrogen-hydrogen gaseous mixture may enter the system at an inlet 12, which, as shown here, is positioned between a compressor 3 and a cold exchanger 4, but which, it is desired to point out, may be positioned at other points in the system as well; for example, before or after the liquefier or one of the liquefier units, before the hot exchanger, etc. The gases are circulated throughout the system by a suitable circulating means which may be a compressor 3 and passed by means of a pipe 11 to a cold exchanger 4, so called because of the fact that therein gases are passed in heat exchange relation with the cold gases coming from a liquefier which is refrigerated. From thence by means of a pipe 13 they are led to a liquefier 5 (which may consist of one or more units) wherein they pass through a coil 14 which is artificially refrigerated. Ammonia in liquid form may be removed after the cold exchanger through a pipe 19 and/or after the liquefier through a pipe 6. From the liquefier the gaseous stream passes by a pipe 15 through the cold exchanger in direction opposite to the flow of the gaseous stream from the compressor and then passes by means of a pipe 16 through a hot exchanger 2, in which it is heated by flowing in heat exchange relation with the hot gases coming from the reaction zone. The gases are conducted from the hot exchanger by a pipe 17 into a catalytic chamber 1, wherein the nitrogen and hydrogen in the presence of a catalyst and under proper conditions of temperature and pressure react to form ammonia. It is the control of the temperature in this reaction zone and the maintenance thereof within a predetermined desired range to which this invention is particularly directed. From the catalytic chamber the reaction product gaseous stream containing the ammonia formed by catalysis is led by a pipe 9 through the hot exchanger giving up a portion of its heat to the ingoing reaction gaseous mixture, and from thence, through a pipe 10, is conducted to the compressor, and thus completes a cycle.

The temperature in the reaction zone may be controlled and maintained within the desired range by withdrawing or by-passing a portion of the reaction product gas through a pipe 7 positioned immediately before the liquefier, and introducing the withdrawn portion into the ingoing reaction mixture subsequent to the final extraction of ammonia. The amount of reaction product gas withdrawn or by-passed may be varied by means of a regulating valve 18, and the amount so withdrawn will depend upon the temperature fluctuations in the system, and more particularly in the reaction zone which it is desired to offset. Thus, if it is found that the temperature in the reaction zone is higher than the desired range, or there is a tendency for it to exceed this range, an amount of reaction product gas containing ammonia is withdrawn through the by-pass 7 and introduced into the ingoing reaction mixture in the pipe 15. This increases the ammonia content of the ingoing reaction mixture above that which is normally present, and decreases the amount of ammonia which may be formed during the passage through the catalyst chamber, thus reducing the amount of heat generated and lowering the temperature of the catalyst. When the temperature conditions have been satisfactorily adjusted the operation of the by-pass is discontinued and again utilized only when the temperature exceeds or tends to exceed the range. Conversely, if the temperature in the reaction zone is too low, the amount of ammonia in the reaction mixture may be reduced below that normally present by suitable lowering of the temperature in the liquefier. It may be observed that this control and maintenance of temperature may be in conjunction or in co-operation with other control factors, namely, the speed of the compressor or circulating means and a by-pass 8 about one or more of the heat exchangers. These three controls may, of course, be used independently or conjointly, and if used conjointly have the combined effect of giving the desired control and maintenance of the temperature in the reaction zone.

It should be understood that ammonia may be introduced into the reaction mixture at points about the system other than at 15. For example, it may be introduced into the reaction mixture by passing the gas directly into the catalyst material in the ammonia converter, preferably at the region of highest activity or temperature. This may be accomplished by opening the valve 20 and permitting a portion of the reaction product gas to pass by means of the pipe 21 to the ammonia converter and be introduced directly into the catalytic material, for example, at 22. The foregoing mode of operation is advantageous, since I have found that it tends to make the control somewhat more rapid and positive.

The process hereinbefore described accordingly provides a method whereby the temperature in the reaction zone may be maintained within the desired limits by altering the percentage of ammonia in the reaction gas entering the catalyst mass. The particular application described accomplishes this by providing a branch connection in the system which will permit the by-passing of a portion of the reaction product gas prior to final extraction of ammonia to the ingoing reaction mixture. This by-pass may be operated intermittently or temporarily whenever the temperature of the reaction zone is, or tends to pass without the desired range, which range is predetermined with respect to the catalyst being used, and, as will be understood by those skilled in the art, may vary with the particular catalyst. There is thus provided a process which may be readily operated commercially and which permits continuous operation under optimum temperature conditions whereby the output of ammonia over an extended period of time is increased.

Since certain changes may be made in carrying out the above process without departing from the scope of the invention, it is intended that all matter contained in the above description shall be interpreted as illustrative and not in a limiting sense.

I claim:

1. In a process for the production of ammonia by catalysis in which a nitrogen hydrogen gas is passed through ammonia synthesis and ammonia removal stages, the improvement which comprises withdrawing a portion of the reaction product gases in varying amount depending on the temperature fluctuations in the reaction zone, said portion of gases being withdrawn after the ammonia synthesis stage but, prior to the completion of the extraction of ammonia, by-passing the withdrawn portion of gas past at least a part of the ammonia removal stage, introducing the withdrawn gas into the reaction mixture, prior to completion of the catalytic treatment of the reaction mixture, and, in correlating the amount of said withdrawn gas introduced into the reaction mixture with changes in temperature in the reaction zone, increasing the amount of said gas introduced into the reaction mixture when the temperatures of the reaction zone rise above a desired temperature and decreasing the amount of said gas introduced into the reaction mixture when the temperatures of the reaction zone fall below a desired temperature.

2. A process for the production of ammonia which comprises reacting a gaseous mixture containing nitrogen and hydrogen catalytically to form ammonia, passing the reaction product gases in heat exchange relation with the ingoing reaction mixture, then in heat exchange relation with the gases from which ammonia has been extracted, by-passing a portion of the reaction product gases prior to completion of ammonia extraction to the ingoing reaction mixture, extracting ammonia, and conducting the gaseous mixture in successive heat exchange relation with the reaction product gases to the reaction zone.

3. A process for the production of ammonia which comprises reacting a gaseous mixture containing nitrogen and hydrogen catalytically to form ammonia, passing the reaction product gases in heat exchange relation with the ingoing reaction mixture, compressing the gases, then passing them in heat exchange relation with the gases from which ammonia has been extracted by cooling, extracting ammonia by cooling, by-passing a portion of the gas prior to completion of ammonia extraction to the ingoing reaction mixture, conducting the gaseous mixture to the reaction zone in successive heat exchange relation with the reaction product gases and introducing to the gaseous stream during the cycle a mixture containing nitrogen and hydrogen.

4. In a cyclic ammonia synthesis process comprising catalysis, heat exchange, gas circulation and ammonia removal, the improvement which comprises removing ammonia by liquefaction, and by-passing a varying amount of gas prior to completion of ammonia removal to maintain the desired temperature condition of catalysis, and in correlating the amount of by-passed gas with changes in catalysis temperatures, increasing the amount of said by-passed gas when the catalysis temperatures rise above a desired temperature and decreasing the amount of said by-passed gas when the catalysis temperatures fall below a desired temperature.

5. In a cyclic ammonia synthesis system comprising a catalyst unit, hot exchanger, compressor, cold exchanger and ammonia liquefier, the improvement which comprises temporarily by-passing the gaseous mixture in varying amounts around the liquefier to maintain the temperature in the catalytic reaction zone within a desired range, and in correlating the amount of by-passed gaseous mixture with changes in temperature in said reaction zone, increasing the amount of said by-passed mixture when the temperatures in the reaction zone rise above a desired range and decreasing the amount of said by-passed mixture when the temperatures in the reaction zone fall below a desired range.

6. In a cyclic process for the production of ammonia by catalysis wherein a nitrogen-hydrogen gas is recirculated through ammonia synthesis and ammonia removal stages, that improvement which comprises by-passing a portion of the reaction product gases in varying amounts past an ammonia removal stage to the reaction mixture on its way to an ammonia synthesis stage to control the temperatures of the ammonia synthesis stage, and in correlating the amount of by-passed reaction product gases with changes in temperature in the synthesis stage, increasing the ammonia content of the gas passed to catalysis when the ammonia synthesis temperatures rise above a desired temperature and decreasing the ammonia content of said gas when the ammonia synthesis temperatures fall below a desired temperature.

7. In a process for the production of ammonia wherein a nitrogen-hydrogen gas is recirculated in a cyclic synthesis system comprising a catalyst unit, heat exchanger with an associated means for by-passing synthesis gas on its way to the catalyst unit around the heat exchanger, a gas compressor, an ammonia removal means and means for by-passing a portion of the reaction product gases past a stage of the ammonia removal means to the synthesis gas on its way from said stage to the catalyst unit, that improvement which comprises by-passing a portion of the reaction product gases in varying amounts past a stage of ammonia removal, and maintaining the temperature in the reaction zone within a desired range by the conjoint effect of variations in the amount of gas by-passed around said heat exchanger and/or the rate of gas circulation and by variations in the amount of gas by-passed past said stage of the ammonia remover to the synthesis gas on its way to the catalyst unit, and in correlating the amount of gas by-passed past said stage of ammonia removal with changes in temperature in said reaction zone, increasing the ammonia content of the gas passed to catalysis when the temperatures in the reaction zone rise above a desired temperature and decreasing the ammonia content of said gas when the temperatures in the reaction zone fall below a desired temperature.

JOHN W. DAVIS.